United States Patent [19]

Sikkenga et al.

[11] Patent Number: 4,725,570
[45] Date of Patent: Feb. 16, 1988

[54] POST-TREATMENT OF AMS-1B CRYSTALLINE BOROSILICATE MOLECULAR SIEVE-BASED CATALYST COMPOSITIONS

[75] Inventors: David L. Sikkenga, Wheaton; Muin S. Haddad, Naperville, both of Ill.

[73] Assignee: Amoco Corporation, Chicago, Ill.

[21] Appl. No.: 799,503

[22] Filed: Nov. 19, 1985

Related U.S. Application Data

[63] Continuation-in-part of Ser. No. 679,484, Dec. 7, 1984, abandoned.

[51] Int. Cl.[4] .......................... B01J 21/02; B01J 29/00
[52] U.S. Cl. ..................................... 502/204; 502/202; 502/207
[58] Field of Search ....................... 502/202, 207, 204

[56] References Cited

U.S. PATENT DOCUMENTS 4,268,420  5/1981  Klotz ................................... 502/202
4,451,685  5/1984  Nevitt et al. ........................ 502/202

Primary Examiner—Carl F. Dees
Attorney, Agent, or Firm—Wallace L. Oliver; William H. Magidson; Ralph C. Medhurst

[57] ABSTRACT

A method to increase hydrocarbon conversion activity of a catalyst comprising an AMS-1B crystalline borosilicate molecular sieve incorporated into a matrix comprises contacting said composition at least once with an aqueous solution containing an ammonium salt and then drying and calcining the resulting composition.

20 Claims, No Drawings

POST-TREATMENT OF AMS-1B CRYSTALLINE BOROSILICATE MOLECULAR SIEVE-BASED CATALYST COMPOSITIONS

CROSS REFERENCE TO RELATED APPLICATIONS

This application is a continuation-in-part of Ser. No. 679,484, filed Dec. 7, 1984 and now abandoned.

BACKGROUND OF THE INVENTION

This invention relates to AMS-1B crystalline molecular sieve-based catalyst systems and particularly to a method to increase activity of such catalysts.

Catalyst systems, generally useful for hydrocarbon conversion, based upon AMS-1B crystalline borosilicate molecular sieve have been described in U.S. Pat. Nos. 4,268,420, 4,269,813, 4,285,919 and Published European Application No. 68,796, all incorporated by reference herein.

As described in these references, catalyst compositions typically are formed by incorporating an AMS-1B crystalline borosilicate molecular sieve material into a matrix such as alumina, silica of silica-alumina to produce a catalyst formulation. The present invention is a method to increase activity in such compositions by treating such a formulated catalyst with an aqueous solution of a suitable ammonium compound. In one method in making AMS-1B crystalline borosilicate, sieve is formed by crystallizing sources for silicon oxide and boron oxide with sodium hydroxide and an organic compound. After crystallization, the resulting sodium form is ion exchanged with an ammonium compound and calcined to yield the hydrogen form of AMS-1B. In another method, AMS-1B crystalline borosilicate is crystallized in the hydrogen form from a mixture containing a diamine in place of a metal hydroxide. Typically, the hydrogen form sieve is gelled with an alumina sol, dried and calcined to yield a catalyst composition. The present invention is not directed to an ion exchange before catalyst formation, but is directed to post treatment of a formulated catalyst composition.

SUMMARY OF THE INVENTION

A method to increase hydrocarbon conversion activity of a catalyst comprising an AMS-1B crystalline borosilicate molecular sieve incorporated into a matrix comprises contacting said composition at least once with an aqueous solution containing a suitable ammonium salt and then drying and calcining the resulting composition.

BRIEF DESCRIPTION OF THE INVENTION

In the method of this invention, a catalyst composition comprising an AMS-1B crystalline borosilicate molecular sieve incorporated into a matrix is contacted with an aqueous solution containing a suitable ammonium salt and then the resulting treated catalyst composition is dried and calcined.

Suitable ammonium salts useful in this invention produce aqueous solutions which are not strongly basic. Ammonium salt solutions with a pH below about 8 may be used, although preferred solutions are pH 7 or below. More preferably, ammonium salt solutions useful in this invention range in pH from about 7 to about 2 and most preferably below 7 to above 4. Suitable ammonium salts do not contain metals such as Groups IA, IB, IIA, IIB, IIIA, IIIB, IVB, VB, VIB, VIIB or VIII metals or rare earth elements. Typically, suitable ammonium salts contain carbon, hydrogen, nitrogen, phosphorus, sulfur, oxygen and halogen atoms such as carboxylic acid salts, halides, oxyhalides, sulphates, sulphites, nitrates, nitrites, phosphates, phosphites, and the like. Suitable salts of carboxylic acids contain 1 to about 12 carbon atoms such as formates, acetates, propionates, lactates, benzoates, citrates, and the like. Ammonium salts especially useful in this invention include ammonium acetate, ammonium nitrate, ammonium chloride, ammonium sulphate, ammonium citrate and the like.

The aqueous ammonium salt solution useful in this invention typically is from about 0.1 to about 4 molar and preferably about 0.5 to about 3 molar, although lower or higher concentrations may be useful. The concentration of suitable ammonium compound is not believed to be critical.

In a typical procedure, the ammonium salt mixture is contacted at least once with an AMS-1B-containing catalyst composition for about 0.1 to about 8 hours, although shorter or longer periods may be useful. Preferably, the contact time is about 15 to about 120 minutes. Ammonium salt mixtures can be recycled over the catalyst composition such that catalyst particles are stationary and do not attrit. Multiple contacts followed by water washes can be performed.

Contact temperature can range from about 0° to about 100° C. at atmospheric pressure, although higher temperatures can be used if the contact is done at above atmospheric pressures. Preferable contact temperature ranges from about 50° to about 100° C.

Typically, sufficient aqueous solution is added to the catalyst composition to form a slurry. Usually, the weight ratio of ammonium salt solution to catalyst in the contact step is above 2:1 and can range up to 100:1 or higher, but typically is from about 10:1 to about 20:1.

The catalyst composition contacted with an ammonium salt mixture according to this invention then is dried and calcined before use as a catalyst. The catalyst composition can be mildly dried for anywhere from a few hours to a few days at varying temperatures, typically about 50°–225° C. Typically, mildly dried product is calcined at temperatures ranging from about 260° to about 850° C. and preferably about 425° to about 600° C. Extreme calcination temperatures or prolonged crystallization times may prove detrimental to the crystal structure or may totally destroy it. Generally, there is no need to raise the calcination temperature beyond about 600° C. Typically, the molecular sieve material is dried in a forced draft oven at about 125° C. to about 200° C. for about 4 to about 16 hours and is then calcined in air in a manner such that the temperature rise does not exceed 125° C. per hour until a temperature of about 540° C. is reached. Calcination at this temperature usually is continued for about 4 to 16 hours.

The catalyst compositions used in this invention are based on AMS-1B crystalline borosilicate molecular sieve, which is described in U.S. Pat. Nos. 4,268,420, 4,269,813, and 4,285,919 and Published European Patent Application No. 68,796, all incorporated herein by reference. AMS-1B crystalline borosilicate generally can be characterized by the X-ray pattern listed in Table A and by the composition formula:

$$0.9 \pm 0.2 M_{2/n}O : B_2O_3 : ySiO_2 : zH_2O$$

wherein M is at least one cation, n is the valence of the cation, y is between 4 and about 600 and z is between 0 and about 160.

TABLE A

| d-Spacing Å (1) | Assigned Strength (2) |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M |

(1) Copper K alpha radiation
(2) VW = very weak; W = weak; M = medium; MS = medium strong; VS = very strong The AMS-1B borosilicate molecular sieve useful in this invention can be prepared by crystallizing an aqueous mixture, at a controlled pH, of sources for cations, an oxide of boron, an oxide of silicon, and an organic template compound.

Typically, the mole ratios of the various reactants can be varied to produce the crystalline borosilicates of this invention. Specifically, the mole ratios of the initial reactant concentrations are indicated below:

|  | Broad | Preferred | Most Preferred |
|---|---|---|---|
| $SiO_2/B_2O_3$ | 5–400 | 10–150 | 10–80 |
| $R_2O^+/[R_2O^+ + M_{2/n}O]$ | 0.1–1.0 | 0.2–0.97 | 0.3–0.97 |
| $OH^-/SiO_2$ | 0.01–11 | 0.1–2 | 0.1–1 |
| $H_2O/OH^-$ | 10–4000 | 10–500 | 10–500 | wherein R is an organic compound and M is at least one cation having a valence n, such as an alkali or an alkaline earth metal cation or hydrogen. By regulation of the quantity of boron (represented as $B_2O_3$) in the reaction mixture, it is possible to vary the $SiO_2/B_2O_3$ molar ratio in the final product.

More specifically, the material useful in the present invention is prepared by mixing a base, a boron oxide source, and an organic template compound in water (preferably distilled or deionized). The order of addition usually is not critical although a typical procedure is to dissolve base and boric acid in water and then add the template compound. Generally, the silicon oxide compound is added with intensive mixing such as that performed in a Waring Blendor and the resulting slurry is transferred to a closed crystallization vessel for a suitable time. After crystallization, the resulting crystalline product can be filtered, washed with water, dried, and calcined.

During preparation, acidic conditions should be avoided. When alkali metal hydroxides are used, the values of the ratio of $OH^-/SiO_2$ shown above should furnish a pH of the system that broadly falls within the range of about 9 to about 13.5. Advantageously, the pH of the reaction system falls within the range of about 10.5 to about 11.5 and most preferably between about 10.8 and about 11.2.

Examples of oxides of silicon useful in this invention include silicic acid, sodium silicate, tetraalkyl silicates and Ludox, a stabilized polymer of silicic acid manufactured by E. I. DuPont de Nemours & Co. Typically, the oxide of boron source is boric acid although equivalent species can be used such as sodium borate and other boron-containing compounds.

Cations useful in formation of AMS-1B crystalline borosilicate include alkali metal and alkaline earth metal cations such as sodium, potassium, lithium, calcium and magnesium. Ammonium cations may be used alone or in conjunction with such metal cations. Since basic conditions are required for crystallization of the molecular sieve of this invention, the source of such cation usually is a hydroxide such as sodium hydroxide. Alternatively, AMS-1B can be prepared directly in the hydrogen form by replacing such metal cation hydroxides with an organic base such as ethylenediamine as described in Published European Application No. 68,796.

Organic templates useful in preparing AMS-1B crystalline borosilicate include alkylammonium cations or precursors thereof such as tetraalkylammonium compounds, especially tetra-n-propylammonium compounds. A useful organic template is tetra-n-propylammonium bromide. Diamines, such as hexamethylenediamine, can be used.

In a more detailed description of a typical preparation of this invention, suitable quantities of sodium hydroxide and boric acid ($H_3BO_3$) are dissolved in distilled or deionized water followed by addition of the organic template. The pH may be adjusted between about 11.0±0.2 using a compatible acid or base such as sodium bisulfate or sodium hydroxide. After sufficient quantities of a silica source such as a silicic acid polymer (Ludox) are added with intensive mixing, preferably the pH is again checked and adjusted to a range of about 11.0±0.2.

Alternatively, AMS-1B crystalline borosilicate molecular sieve can be prepared by crystallizing a mixture of sources for an oxide of silicon, an oxide of boron, an alkyl ammonium compound and ethylenediamine such that the initial reactant molar ratios of water to silica range from about 5 to about 25, preferably about 5 to about 20 and most preferably from about 10 to about 15. In addition, preferable molar ratios for initial reactant silica to oxide of boron range from about 4 to about 150, more preferable from about 5 to about 80 and most preferably from about 5 to about 20. The molar ratio of ethylenediamine to silicon oxide should be about above about 0.05, typically below 5, preferably between about 0.1 and about 1.0 and most preferably between about 0.2 and 0.5. The molar ratio of alkylammonium compound, such as tetra-n-propylammonium bromide, to silicon oxide can range from 0 to about 1 or above, typically above about 0.005, preferably about 0.01 to about 0.1, more preferably about 0.01 to about 0.1 an most preferably about 0.2 to about 0.05.

The resulting slurry is transferred to a closed crystallization vessel and reacted usually at a pressure at least the vapor pressure of water for a time sufficient to permit crystallization which usually is about 0.25 to about 20 days, typically is about one to about ten days and preferably is about one to about seven days, at a temperature ranging from about 100° to about 250° C., preferably about 125° to about 200° C. The crystallizing material can be stirred or agitated as in a rocker bomb. Preferably, the crystallization temperature is maintained below the decomposition temperature of the organic template compound. Especially preferred conditions are crystallizing at about 165° C. for about five to about seven days. Samples of material can be removed during crystallization to check the degree of crystallization and determine the optimum crystallization time.

The crystalline material formed can be separated and recovered by well-known means such as filtration with aqueous washing. This material can be mildly dried for anywhere from a few hours to a few days at varying temperatures, typically about 50°–225° C., to form a dry cake which can then be crushed to a powder or to small particles and extruded, pelletized, or made into forms suitable for its intended use. Typically, materials prepared after mild drying contain the organic template compound and water of hydration within the solid mass and a subsequent activation or calcination procedure is necessary, if it is desired to remove this material from the final product. Typically, mildly dried product is calcined at temperatures ranging from about 260° to about 850° C. and preferably about 425° to about 600° C. Extreme calcination temperatures or prolonged crystallization times may prove detrimental to the crystal structure or may totally destroy it. Generally, there is no need to raise the calcination temperature beyond about 600° C. in order to remove organic material from the originally formed crystalline material. Typically, the molecular sieve material is dried in a forced draft oven at 165° C. for about 16 hours and is then calcined in air in a manner such that the temperature rise does not exceed 125° C. per hour until a temperature of about 540° C. is reached. Calcination at this temperature usually is continued for about 4 to 16 hours.

A catalytically active material can be placed onto the borosilicate structure, either before or after incorporation into a matrix, by ion exchange, impregnation, a combination thereof, or other suitable contact means. Before placing a catalytically active metal ion or compound on the borosilicate structure, the borosilicate should be in the hydrogen form. If the sieve was prepared using a metal hydroxide, such as sodium hydroxide, the hydrogen form typically, is produced by exchange one or more times with ammonium ion, typically using ammonium acetate, followed by drying and calcination as described above.

The original cation in the AMS-1B crystalline borosilicate can be replaced all or in part by ion exchange with other cations including other metal ions and their amine complexes, alkylammonium ions, ammonium ions, hydrogen ions, and mixtures thereof. Preferred replacing cations are those which render the crystalline borosilicate catalytically active, especially for hydrocarbon conversion. Typical catalytically active ions include hydrogen, metal ions of Groups IB, IIA, IIB, IIIA, VB, VIB and VIII, and of manganese, vanadium, chromium, uranium, and rare earth elements.

Also, water soluble salts of catalytically active materials can be impregnated onto the crystalline borosilicate of this invention. Such catalytically active materials include metals of Groups IB, IIA, IIB, IIIA, IIIB, IVB, VB, VIB, VIIB, and VIII, and rare earth elements.

Examples of catalytically active elements include ruthenium, rhodium, iron, cobalt, and nickel. Mixtures of elements can be used. Other catalytic materials include ions and compounds of aluminum, lanthanum, molybdenum, tungsten, and noble metals such as ruthenium, osmium, rhodium, iridium, palladium, and platinum. Other additional catalytic materials can be ions and compounds of scandium, yttrium, titanium, zirconium, hafnium, vanadium, niobium, tantalum, chromium, cerium, manganese, cobalt, iron, zinc and cadmium. Specific combinations of non-noble metals of Group VIII and other catalytic materials include ions or compounds of nickel and osmium, nickel and lanthanum, nickel and palladium, nickel and iridium, nickel and molybdenum, and nickel and tungsten.

Ion exchange and impregnation techniques are well-known in the art. Typically, an aqueous solution of a cationic species is exchanged one or more times at about 25° to about 100° C. A hydrocarbon-soluble metal compound such as a metal carbonyl also can be used to place a catalytically active material. Impregnation of a catalytically active compound on the borosilicate or on a composition comprising the crystalline borosilicate suspended in and distributed throughout a matrix of a support material, such as a porous refractory inorganic oxide such as alumina, often results in a suitable catalytic composition. A combination of ion exchange and impregnation can be used. Presence of sodium ion in a composition usually is detrimental to catalytic activity.

The amount of catalytically active material placed on the AMS-1B borosilicate can vary from about 0.01 weight percent to about thirty weight percent, typically from about 0.05 to about 25 weight percent, depending on the process use intended. The optimum amount can be determined easily by routine experimentation.

The AMS-1B crystalline borosilicate useful in this invention is admixed with or incorporated within various binders or matrix materials depending upon the intended process use. The crystalline borosilicate can be combined with active or inactive materials, synthetic or naturally-occurring zeolites, as well as inorganic or organic materials which would be useful for binding the borosilicate. Well-known materials include silica, silica-alumina, alumina, magnesia, titania, zirconia, alumina sols, hydrated aluminas, clays such as bentonite or kaolin, or other binders well-known in the art. Typically, the borosilicate is incorporated within a matrix material by blending with a sol of the matrix material and gelling the resulting mixture. Also, solid particles of the borosilicate and matrix material can be physically admixed. Typically, such borosilicate compositions can be pelletized or extruded into useful shapes. The crystalline borosilicate content can vary anywhere from a few up to 100 wt. % of the total composition. Catalytic compositions can contain about 0.1 wt. % to about 100 wt. % crystalline borosilicate material and preferably contain about 10 wt. % to about 95 wt. % of such material and most preferably contain about 20 wt. % to about 80 wt. % of such material.

Catalytic compositions comprising the crystalline borosilicate material of this invention and a suitable matrix material can be formed by adding a finely-divided crystalline borosilicate and a catalytically active metal compound to an aqueous sol or gel of the matrix material. The resulting mixture is thoroughly blended and gelled typically by adding a material such as ammonium hydroxide. The resulting gel can be dried and calcined to form a composition in which the crystalline borosilicate and catalytically active metal compound are distributed throughout the matrix material.

Catalyst compositions treated with an ammonium compound according to this invention can be in powder form or already in extrudate form.

Catalysts prepared according to this invention can be used in various hydrocarbon conversion processes such as isomerization of alkyl aromatics or olefins, alkylation of aromatics; conversion of synthesis gas, alcohols, aldehydes or ethers to hydrocarbons such as olefins, paraffins, and aromatics; conversion of alkane or alkenes to isomerized, oligomerized and aromatized products; and the like. As used herein, the term hydrocarbon conversion means any changing or altering the carbon bonding or structure of an organic compound containing at least carbon and hydrogen atoms. Included in hydrocarbon conversion processes are isomerization, oligomerization, polymerization, dehydration, dehydrogenation, alkylation, dealkylation, aromatization, hydrocracking, dewaxing and the like.

Specific details of catalyst preparations are described in U.S. Pat. No. 4,269,813 and European Published Application No. 68,796 both incorporated by reference herein.

EXAMPLES 1 and 2

A catalyst composition comprising 40 wt. % AMS-1B in silica was prepared by blending 24.2 grams of hydrogen-form AMS-1B crystalline borosilicate molecular sieve and 250 grams of silica sol (Nalco 2326, 14.5 wt. % solids with a surface area of 600 m²/gram and a sodium content of about 100 ppm) for five minutes at a high speed in a one-quart blender. The resulting slurry was poured into the 600-milliliter beaker followed by 250 milliliters of reagent grade n-propanol with stirring. This mixture was evaporated to dryness at a maximum temperature of 150° C., dried for four hours at 80° C. and then calcined for fours at 300° C. The calcined product was crushed and sieved to yield a powder material with particles having diameters from 0.0278 to 0.164 inch. A sample of this material was used in Run A. A five-gram portion of the powdered catalyst was placed in a vertical glass column with a nine-millimeter inside diameter and heated to 80° C. with a water jacket. A 50-milliliter sample 2.6 Molar aqueous ammonium acetate was recycled through the column of catalyst for one hour. This treatment procedure was repeated with a fresh sample of aqueous ammonium acetate followed by a rinse with 100 milliliters of distilled water. The resulting material was dried for sixteen hours at 80° C. and used in Example 1.

To a 12-gram sample of the aforementioned non-treated catalyst in 100 milliliters of distilled water slowly was added with gentle agitation 0.054 gram of Pt(NH$_3$)$_4$Cl$_2$.H$_2$O in 20 milliliters of water. The resulting mixture was heated to reflux for 1.5 hours and the solid catalyst composition filtered and rinsed with 350 milliliters of hot distilled water. The resulting catalyst was dried for 4 hours at 80° C. and then calcined for 4 hours at 300° C. The catalyst was used in Run B. A sample catalyst material from Run B was treated with ammonium acetate in a manner similar to that described for Example 1. However, only 50 milliliters of ammonium acetate solution were used with a recycle time of one hour. The catalyst is dried and used in Example 2. A loss of platinum from a catalyst is noted as a result of the ammonium treatment. Analyses of the aforementioned catalyst composition are shown in Table I.

TABLE I

|  | Run A | Ex. 1 | Run B | Ex. 2 |
| --- | --- | --- | --- | --- |
| Elemental Analysis |  |  |  |  |
| Si (wt. %) | 43.4 | 45.2 | 44.8 | 46.2 |
| B (wt. %) | 0.28 | 0.28 | 0.09 | 0.10 |
| Na (ppm) | 710 | <50 | 400 | <50 |
| K (ppm) | <44 | <44 | <50 | <50 |
| Ni (ppm) | 42 | 34 | 40 | <50 |
| Al (ppm) | 420 | 420 | 570 | 760 |
| Pt (ppm) | <10 | <10 | 3150 | 1210 |
| Physical Properties |  |  |  |  |
| Surface Area (m²/g) | 357 | 352 | 374 | 381 |
| Pore Volume (cc/g) | 0.410 | 0.433 | 0.436 | 0.451 |

TABLE I-continued

|  | Run A | Ex. 1 | Run B | Ex. 2 |
| --- | --- | --- | --- | --- |
| Average Pore Radius (Angstroms) | 28 | 29 | 28 | 28 |

Isomerization Tests

Samples (1.88 grams) of each of the aforementioned catalyst compositions were packed into a reactive tube (0.5 inch OD) and heated to 540° C. in flowing hydrogen. A feedstock containing hydrogen, helium and a hydrocarbon, either n-butane or a mixture of n-butane and 1-butene, with a hydrogen/hydrocarbon (H$_2$/HC) molar ratio of 15 and a hydrocarbon partial pressure of 0.09 atmospheres was passed over the catalyst at the conditions shown in Table II. The effluent was analyzed by gas chromatography. In comparing the results from Run A and Example 1, it is seen that the catalyst without ammonium acetate treatment (Run A) shows very little isomerization of n-butene to isobutylene, while the treated catalyst (Example 1) was very active for acid catalyzed reactions yielding nearly equilibrium concentration of isobutylene. A comparison of Run B and Example 2 shows that the platinum-exchanged catalyst with no ammonium treatment was moderately active in converting n-butane with a percent approach to theoretical equilibrium (PATE) of about 68%, while the treated catalyst (Example 2) yielded 27% more isobutylene under the same conditions as Run B. A portion of the improvement is attributable to increased isomerization activity while another portion may be due to lower by-product formation.

TABLE II

|  | 1-Butene Isomerization | | Butane Dehydroisomerization | |
| --- | --- | --- | --- | --- |
|  | Run A | Ex. 1 | Run B | Ex. 2 |
| Reaction Conditions |  |  |  |  |
| Hydrocarbon Feed (wt. %) |  |  |  |  |
| n-Butane | 69 | 69 | 100 | 100 |
| n-Butenes | 30 | 30 | — | — |
| Temp. (°C.) | 541 | 540 | 541 | 541 |
| Contact Time (seconds) | 0.22 | 0.25 | 0.27 | 0.25 |
| Product Compositions (wt. %) |  |  |  |  |
| n-Butenes | 29.7 | 10.1 | 19.9 | 24.5 |
| Isobutylene | 0.42 | 6.8 | 8.7 | 11.1 |
| n-Butane | 63.6 | 63.6 | 36.6 | 55.0 |
| Isobutane | 0.04 | 0.20 | 10.0 | 3.34 |
| Other | 6.24 | 19.4 | 24.8 | 6.06 |
| PATE[1] | 3.1 | 90.6 | 68.5 | 70.2 |

[1]Percent Approach To Equilibrium of isobutylene with respect to C$_4$ olefins.

EXAMPLE 3

A sample of AMS-1B crystalline borosilicate based catalyst was prepared according to that described in published European Patent Application No. 68,796. A solution of 19 grams of ammonium acetate and 450 grams of distilled water was added to 45 grams of 1/16 inch extrudates formed from the aforementioned AMS-1B borosilicate-based catalyst. The mixture was heated for 1 hour at 100° C. The solid catalyst was recovered by filtration, washed, dried at 130° C. for 12 hours, and then calcined at 537° C. for 12 hours. The resulting catalyst composition was used to isomerize xylenes using a feed containing 80 wt. % mixed xylenes, 16 wt.

% ethylbenzene and 4 wt. % heavy aromatics. The reaction conditions were temperature=360° C.; $H_2$/HC molar ratio=2.0; LWHSV=7.0 $hr^{-1}$; and pressure=250 psig. The ethylbenzene conversion activity using a catalyst treated according to this invention as described above was 30%. A similar conversion run using catalyst not so treated showed an ethylbenzene conversion activity of only 24% while another run using a similar catalyst which had been treated with pure water at 100° C. for two hours showed an ethylbenzene activity of 26%. Thus, a catalyst treated according to this invention showed a substantial increase in hydrocarbon conversion activity.

EXAMPLE 4

Comparative Run C

A 104.2-gram portion of VFA alumina, 28 wt. % loss on ignition, (Davison Chemical Co.) was mixed in a blender with 50.0 grams of hydrogen-form AMS-1B crystalline borosilicate molecular sieve prepared according to European Published Application No. 68,796 using ethylenediamine as a base, Ludox AS-40 as a silica source, and boric acid as a boron oxide source. Enough water (100 milliliters) was added to the blended mixture to make a paste and the resulting mixture dried at 200° C. for 16 hours, ground to 18/40 mesh and calcined at 483° C. for 12 hours. A sample of the resulting formulated catalyst was used for Comparative Run C.

To a solution of 21.0 grams of ammonium acetate in 210 grams of distilled water were added 21.0 grams of formulated catalyst, prepared above, and mixed for one hour at 90°-100° C. The resulting mixture was filtered and the solids dried at 200° C. for three hours and then calcined at 483° C. for 12 hours.

A sample of 15.00 grams of AMS-1B crystalline borosilicate-based catalyst prepared above was placed in a 0.5-inch inside diameter tubular reactor and pretreated with hydrogen at 2.0 SCF/hr at 343° C. and 200 psig for 2 hours; $C_8$ aromatic feed then was introduced in the reactor at about 2.0 grams/minute on a once-through basis with no recycle. Liquid effluent was analyzed by gas chromatography. Results from testing an ammonium acetate treated sample (Example 4) and a non-treated sample (Comparative Run C) are shown in Table III. The data show that the catalyst of Example 4 show substantial ethylbenzene conversion increase in comparison to the non-treated sample.

TABLE III

|  | Comparative Run C | | Example 4 | |
|---|---|---|---|---|
| Conditions | | | | |
| Temperature (°C.) | 343 | | 341 | |
| Pressure (psig) | 200 | | 200 | |
| Hydrogen/Hydrocarbon (molar ratio) | 2.00 | | 1.97 | |
| Space Velocity (WHSV) ($hr^{-1}$) | 8.0 | | 8.1 | |
| Components (wt. %) | Feed | | Feed | |
| Paraffins & Naphthenes | 1.85 | 1.88 | 1.85 | 1.99 |
| Benzene | 0.26 | 0.50 | 0.27 | 1.74 |
| Toluene | 0.88 | 0.96 | 0.90 | 1.94 |
| Ethylbenzene | 14.05 | 13.80 | 14.08 | 11.32 |
| p-Xylene | 8.32 | 15.03 | 8.33 | 18.58 |
| m-Xylene | 49.07 | 43.68 | 49.11 | 41.22 |
| o-Xylene | 22.18 | 20.50 | 22.14 | 17.33 |
| Ethyltoluenes | 1.00 | 0.99 | 0.99 | 1.13 |
| Trimethylbenzenes | 0.44 | 0.45 | 0.43 | 0.75 |
| Diethylbenzenes | 0.85 | 0.91 | 0.84 | 1.59 |
| Dimethylethylbenzenes | 1.05 | 1.19 | 1.02 | 2.31 |
| Tetramethylbenzenes | 0.06 | 0.13 | 0.04 | 0.11 |

TABLE III-continued

|  | Comparative Run C | Example 4 |
|---|---|---|
| Results | | |
| Ethylbenzene Conversion (%) | 1.8 | 19.6 |
| Xylene Loss (%) | 0.4 | 2.9 |
| p-Xylene Approach to Equilibrium (%) | 64.2 | 102.6 |
| Ethylbenzene Conversion by | | |
| Hydrodeethylation (%) | 23.4 | 3.3 |
| Disproportionation (%) | 33.8 | 42.9 |
| Transmethylation (%) | 0.0 | 4.5 |
| Transethylation (%) | 42.0 | 36.9 |

EXAMPLE 5

Comparative Run D

To 1000 grams of distilled water was added 104.1 grams of VFA alumina, 18 wt. % loss on ignition, and 50.0 grams of hydrogen-form AMS-1B crystalline borosilicate molecular sieve prepared as described in Example 4. This mixture was mixed for five minutes followed by addition of 60 milliliters of concentrated aqueous ammonium hydroxide with mixing continuing for five more minutes. The resulting product was dried at 200° C. for 16 hours, ground to 18/40 mesh and calcined at 482° C. for 12 hours. A sample for the resulting formulated catalyst was used for Comparative Run D.

A portion of the formulated catalyst (25.0 grams) was mixed in a solution of 25.0 grams of ammonium acetate in 250 milliliters of distilled water for one hour at 90°-100° C. The resulting mixture was filtered and the solids dried at 200° C. for three hours and calcined at 483° C. for 12 hours.

Samples of treated (Example 5) and non-treated material (Comparative Run D) were tested as described in Example 4. Results presented in Table IV show that the ammonium acetate treated catalyst converted ethylbenzene substantially more in comparison to Comparative Run D.

TABLE IV

|  | Comparative Run D | | Example 5 | |
|---|---|---|---|---|
| Conditions | | | | |
| Temperature (°C.) | 343 | | 344 | |
| Pressure (psig) | 200 | | 200 | |
| Hydrogen/Hydrocarbon (molar ratio) | 1.99 | | 1.99 | |
| Space Velocity (WHSV) ($hr^{-1}$) | 8.01 | | 8.00 | |
| Components (wt. %) | Feed | | Feed | |
| Paraffins & Naphthenes | 1.87 | 1.96 | 1.85 | 2.09 |
| Benzene | 0.28 | 2.20 | 0.27 | 2.85 |
| Toluene | 0.90 | 1.78 | 0.89 | 2.39 |
| Ethylbenzene | 14.08 | 10.92 | 14.06 | 9.60 |
| p-Xylene | 8.33 | 18.46 | 8.33 | 18.10 |
| m-Xylene | 49.08 | 40.84 | 49.08 | 40.18 |
| o-Xylene | 22.11 | 17.08 | 22.14 | 16.82 |
| Ethyltoluenes | 0.99 | 0.94 | 0.99 | 1.15 |
| Trimethylbenzenes | 0.43 | 0.75 | 0.43 | 0.94 |
| Diethylbenzenes | 0.84 | 1.50 | 0.85 | 1.68 |
| Dimethylethylbenzenes | 1.04 | 3.44 | 1.05 | 4.06 |
| Tetramethylbenzenes | 0.06 | 0.13 | 0.06 | 0.13 |
| Results | | | | |
| Ethylbenzene Conversion (%) | 22.4 | | 31.7 | |
| p-Xylene Approach to Equilibrium (%) | 103.3 | | 102.8 | |
| Xylene Loss (%) | 3.8 | | 5.4 | |
| Ethylbenzene Conversion by | | | | |
| Hydrodeethylation (%) | 0.0 | | 2.2 | |
| Disproportionation (%) | 32.4 | | 29.6 | |
| Transmethylation (%) | 0.0 | | 3.1 | |

TABLE IV-continued

|  | Comparative Run D | Example 5 |
|---|---|---|
| Transethylation (%) | 58.6 | 53.5 |

EXAMPLE 6
Comparative Run E

To 734 grams of colloidal PHF silica (~10 wt. % solids) were added 50.0 grams of hydrogen-form AMS-1B crystalline borosilicate molecular sieve prepared as described in Example 4. The mixture was gelled by addition of 60 milliliters of concentrated aqueous ammonium hydroxide (18 wt. % NH$_3$). The resulting soupy mixture was dried at 200° C. for 16 hours, ground to 18/40 mesh and calcined at ~482° C. for 12 hours. A portion of this catalyst formulation was used for Comparative Run E.

A portion of the formulated catalyst (40.0 grams) was mixed in a solution of 40.0 grams of ammonium acetate in 400 milliliters of distilled water for one hour at 90°-100° C. The resulting mixture was filtered and the solids dried at 200° C. for three hours and calcined at 483° C. for 12 hours.

Samples of treated (Example 6) and non-treated material (Comparative Run E) were tested as described in Example 4. Results presented in Table V show that the ammonium acetate treated catalyst converted ethylbenzene substantially more in comparison to Comparative Run E.

TABLE V

|  | Comparative Run E | | Example 6 | |
|---|---|---|---|---|
| Conditions |  |  |  |  |
| Temperature (°C.) | 343 | | 343 | |
| Pressure (psig) | 200 | | 200 | |
| Hydrogen/Hydrocarbon (molar ratio) | 1.99 | | 1.99 | |
| Space Velocity (WHSV) (hr$^{-1}$) | 8.09 | | 8.07 | |
| Components (wt. %) | Feed | | Feed | |
| Paraffins & Naphthenes | 1.85 | 1.83 | 1.85 | 2.15 |
| Benzene | 0.26 | 2.17 | 0.27 | 3.17 |
| Toluene | 0.89 | 1.85 | 0.90 | 2.68 |
| Ethylbenzene | 14.06 | 10.85 | 14.07 | 9.17 |
| p-Xylene | 8.31 | 18.47 | 8.31 | 17.94 |
| m-Xylene | 49.09 | 40.85 | 49.07 | 39.70 |
| o-Xylene | 22.16 | 17.12 | 22.15 | 16.62 |
| Ethyltoluenes | 0.99 | 0.98 | 0.99 | 1.19 |
| Trimethylbenzenes | 0.43 | 0.80 | 0.43 | 1.04 |
| Diethylbenzenes | 0.85 | 1.53 | 0.86 | 1.61 |
| Dimethylethylbenzenes | 1.04 | 3.43 | 1.05 | 4.57 |
| Tetramethylbenzenes | 0.06 | 0.13 | 0.06 | 0.18 |
| Results |  |  |  |  |
| Ethylbenzene Conversion (%) | 22.8 | | 34.9 | |
| p-Xylene Approach to Equilibrium (%) | 103.2 | | 103.2 | |
| Xylene Loss (%) | 3.8 | | 6.5 | |
| Ethylbenzene Conversion by |  |  |  |  |
| Hydrodeethylation (%) | 0.0 | | 3.6 | |
| Disproportionation (%) | 32.4 | | 24.3 | |
| Transmethylation (%) | 0.0 | | 3.5 | |
| Transethylation (%) | 57.4 | | 56.9 | |

EXAMPLE 7
Comparative Runs F AND G

A series of experiments were performed to demonstrate that treatment with an ammonium salt according to this invention of a catalyst formulation in a matrix is distinct from an prior ammonium salt treatment of the molecular sieve. Thus, mere reduction of sodium content does not explain the effect demonstrated in this invention. A control sample (Run F) was prepared as follows: To 78.0 grams of Davison VFA alumina (~28 % loss on ignition) were added 37.5 grams of hydrogen-form AMS-1B crystalline borosilicate molecular sieve prepared as described in Example 4. The mixture was blended at high speed for three minutes and then calcined at 483° C. for 12 hours and ground to 18/40 mesh. The sodium content was 28.7 ppm. A portion of this catalyst formulation was used for Comparative Run F.

A portion of this formulated catalyst (30.0 grams) was mixed in a solution of 30.0 grams of ammonium acetate in 300 milliliters of distilled water in a one-liter beaker for one hour at 90°-100° C. The resulting mixture was filtered and the solids dried at 200° C. for 16 hours and calcined at 483° C. for 12 hours. The sodium content of this post-treated catalyst was 6.7 ppm. This sample was used for Example 7.

Portions of hydrogen-form AMS-1B crystalline borosilicate molecular sieve and VFA alumina were pretreated separately with an aqueous solutions of ammonium acetate and then formulated in to a catalyst formulation as described above except that the formulated catalyst was not post-treated with ammonium acetate. Infrared analysis did not show presence of aluminum in the sieve crystalline framework. The sodium content of this pretreated catalyst was 8.5 ppm.

Samples of post-treated (Example 7), non-treated material (Comparative Run F) and pre-treated (Comparative Run G) were tested as described in Example 4. Results presented in Table VI show that the ammonium acetate post-treated catalyst had a higher ethylbenzene conversion and paraxylene approach to equilibrium in comparison to Comparative Runs F or G even though the catalysts of Example 7 and Run G had essentially the same sodium content. Table VIII summarizes these data.

TABLE VI

|  | Comparative Run F | | Example 7 | | Comparative Run G | |
|---|---|---|---|---|---|---|
| Conditions |  |  |  |  |  |  |
| Temperature (°C.) | 343 | | 343 | | 343 | |
| Pressure (psig) | 200 | | 200 | | 200 | |
| Hydrogen/Hydrocarbon (molar ratio) | 1.91 | | 1.97 | | 2.05 | |
| Space Velocity (WHSV) (hr$^{-1}$) | 8.05 | | 7.89 | | 7.95 | |
| Components (wt. %) | Feed | | Feed | | Feed | |
| Paraffins & Naphthenes | 4.31 | 4.25 | 4.29 | 4.07 | 4.30 | 4.31 |
| Benzene | 0.18 | 0.28 | 0.18 | 1.30 | 0.17 | 0.41 |
| Toluene | 0.30 | 1.85 | 0.30 | 0.88 | 0.30 | 0.34 |
| Ethylbenzene | 15.75 | 15.55 | 15.76 | 13.34 | 15.75 | 15.35 |
| p-Xylene | 8.89 | 13.16 | 8.87 | 18.46 | 8.87 | 14.49 |
| m-Xylene | 47.88 | 44.50 | 47.90 | 41.12 | 47.90 | 43.75 |
| o-Xylene | 22.08 | 21.12 | 22.08 | 17.34 | 20.44 | 22.08 |
| Ethyltoluenes | 0.09 | 0.10 | 0.09 | 0.30 | 0.09 | 0.10 |
| Trimethylbenzenes | 0.22 | 0.23 | 0.22 | 0.53 | 0.22 | 0.24 |
| Diethylbenzenes | 0.22 | 0.27 | 0.21 | 0.85 | 0.22 | 0.31 |
| Dimethylethylbenzenes | 0.11 | 0.18 | 0.10 | 1.46 | 0.09 | 0.23 |
| Tetramethylbenzenes | 0.01 | 0.02 | 0.01 | 0.37 | 0.01 | 0.05 |
| Results |  |  |  |  |  |  |
| Ethylbenzene Conversion (%) | 1.2 | | 15.4 | | 2.5 | |
| p-Xylene Approach to Equilibrium (%) | 43.8 | | 102.2 | | 57.4 | |
| Xylene Loss (%) | 0.14 | | 3.4 | | 0.30 | |
| Ethylbenzene Conversion by |  |  |  |  |  |  |
| Hydrodeethylation (%) | 21.8 | | 6.1 | | 33.8 | |
| Disproportionation (%) | 44.1 | | 41.7 | | 37.3 | |

TABLE VI-continued

| | Comparative Run F | Example 7 | Comparative Run G |
|---|---|---|---|
| Transmethylation (%) | 2.6 | 7.8 | 1.9 |
| Transethylation (%) | 31.4 | 44.5 | 33.8 |

TABLE VII

| | Example 7 | Run F | Run G |
|---|---|---|---|
| Sieve Treatment | No | No | Yes |
| Alumina Treatment | No | No | Yes |
| Catalyst Post-treatment | Yes | No | No |
| Sodium (ppm) | 6.7 | 28.6 | 8.5 |
| PATE (%) | 102.2 | 43.8 | 57.4 |
| EB Conversion (wt. %) | 15.4 | 1.2 | 2.5 |

What is claimed is:

1. A method to increase hydrocarbon conversion activity of a catalyst comprising a hydrogen form AMS-1B crystalline borosilicate molecular sieve incorporated into a matrix comprising contacting said composition at least once with an aqueous solution containing a suitable ammonium salt and then drying and calcining the resulting composition.

2. The method of claim 1 wherein the aqueous ammonium salt solution has a pH below about 8.

3. The method of claim 1 wherein the aqueous ammonium salt solution has a pH of about 7 to about 4.

4. The method of claim 1 wherein the ammonium salt is a salt of a carboxylic acid.

5. The method of claim 1 wherein the aqueous mixture is an aqueous solution of ammonium acetate or ammonium nitrate.

6. The method of claim 1 wherein the aqueous mixture is between about 0.1 and 4.0 molar in ammonium salt and the catalyst composition is contacted with aqueous ammonium salt solution for about 0.1 to about 8 hours.

7. The method of claim 1 wherein the catalyst composition comprises AMS-1B crystalline borosilicate molecular sieve incorporated into a matrix of alumina, silica or silica-alumina.

8. The method of claim 7 wherein the catalyst composition comprises from about 10 to about 95 wt. % AMS-1B incorporated into an alumina, silica or silica-alumina matrix.

9. The method of claim 7 wherein the catalyst composition comprises from about 20 to about 80 wt. % AMS-1B incorporated into an alumina, silica or silica-alumina matrix.

10. The method of claim 1 wherein a catalytically active ion or compound of Groups IB, IIA, IIB, IIIA, IIIB, IVB, VB, VIB, VIIB or VIII or rare earth elements or a combination thereof are placed onto the catalyst composition after said contact with an ammonium salt and subsequent drying and calcination of the resultant composition.

11. The method of claim 1 wherein nickel, molybdenum, tungsten, cobalt, cadmium, a noble metal or a combination thereof is place onto the catalyst composition.

12. A method to increase hydrocarbon conversion activity of a catalyst comprising a hydrogen-form AMS-1B crystalline borosilicate molecular sieve incorporated into an alumina, silica or silica-alumina matrix comprising contacting said composition with an aqueous solution of ammonium acetate or ammonium nitrate and then drying and calcining the resulting composition.

13. The method of claim 12 wherein the catalyst composition comprises from about 20 to about 80 wt. % AMS-1B incorporated into an alumina, silica or silica-alumina matrix.

14. The method of claim 12 wherein the catalyst composition is contacted with ammonium acetate solution for about 0.1 to about 8 hours at about 0° to about 100° C.

15. The method of claim 12 wherein the resulting composition is dried at about 50° to about 225° C. for about four to about twenty hours and calcined at about 260° to about 850° C. for about four to about sixteen hours.

16. The method of claim 12 wherein nickel, molybdenum, tungsten, cobalt, cadmium, a noble metal or a combination thereof is placed onto the catalyst composition.

17. The method of claim 12 wherein the resulting composition is dried at about 125° to about 200° C. for about four to about sixteen hours and then calcined at about 425° to about 600° C. for about four to about sixteen hours.

18. The method of claim 17 wherein the catalyst composition is contacted with about 0.5 to about 3 molar aqueous solution of ammonium acetate at about 50° to about 100° C. for about 15 to about 120 minutes.

19. The method of claim 18 wherein the matrix comprises alumina or silica-alumina.

20. The method of claim 18 wherein the matrix comprises silica.

* * * * *